US010872736B2

(12) United States Patent
Zhi et al.

(10) Patent No.: US 10,872,736 B2
(45) Date of Patent: Dec. 22, 2020

(54) ROBUST ELECTRICAL COMPONENT AND AN ELECTROLYTE FOR USE IN AN ELECTRICAL COMPONENT

(71) Applicant: City University of Hong Kong, Kowloon (HK)

(72) Inventors: Chunyi Zhi, Shatin (HK); Zhuoxin Liu, Kowloon (HK)

(73) Assignee: City University of Hong Kong, Kowloon (HK)

( * ) Notice: Subject to any disclaimer, the term of this patent is extended or adjusted under 35 U.S.C. 154(b) by 27 days.

(21) Appl. No.: 15/990,982

(22) Filed: May 29, 2018

(65) Prior Publication Data
US 2019/0371535 A1 Dec. 5, 2019

(51) Int. Cl.
| | |
|---|---|
| H01G 11/28 | (2013.01) |
| H01G 11/36 | (2013.01) |
| H01G 11/54 | (2013.01) |
| H01G 11/68 | (2013.01) |
| H01G 11/70 | (2013.01) |
| H01G 11/84 | (2013.01) |

(52) U.S. Cl.
CPC ............ *H01G 11/54* (2013.01); *H01G 11/28* (2013.01); *H01G 11/36* (2013.01); *H01G 11/68* (2013.01); *H01G 11/70* (2013.01); *H01G 11/84* (2013.01)

(58) Field of Classification Search
CPC ........ H01G 11/54; H01G 11/36; H01G 11/28; H01G 11/68; H01G 11/84; H01G 11/70
See application file for complete search history.

(56) References Cited

U.S. PATENT DOCUMENTS

| | | | | |
|---|---|---|---|---|
| 9,972,451 | B2* | 5/2018 | Zhi | H01G 11/14 |
| 2012/0088155 | A1* | 4/2012 | Yushin | H01M 2/16 |
| | | | | 429/217 |
| 2018/0166662 | A1* | 6/2018 | Zhi | H01M 2/0275 |
| 2018/0204688 | A1* | 7/2018 | Lim | H01G 11/46 |
| 2018/0240608 | A1* | 8/2018 | Deng | H01G 11/36 |
| 2019/0109358 | A1* | 4/2019 | Chai | H01M 12/005 |
| 2019/0272953 | A1* | 9/2019 | Phillips | H01G 4/005 |

FOREIGN PATENT DOCUMENTS

| | | | |
|---|---|---|---|
| CN | 103396562 A | * | 11/2013 |
| CN | 104530311 | | 5/2016 |
| CN | 107481869 A | * | 12/2017 |
| CN | 108586664 A | * | 9/2018 |

(Continued)

OTHER PUBLICATIONS

Lu, X., et al, "Flexible solid-state supercapacitors: design, fabrication and applications", Energy Environmental Science. 7, 2160-63 (2014).

(Continued)

*Primary Examiner* — Nathan Milakovich
(74) *Attorney, Agent, or Firm* — Renner Kenner Greive Bobak Taylor & Weber

(57) ABSTRACT

A System and a method for an electrolyte for use in a supercapacitor including a hydrogel including a polymer matrix including at least two crosslinked structures; an aqueous solution including the polymer matrix within the aqueous solution, and wherein the electrolyte can dissipate energy in response to mechanical loads.

38 Claims, 13 Drawing Sheets

(56) References Cited

FOREIGN PATENT DOCUMENTS

| CN | 110690062 A | * | 1/2020 |
|---|---|---|---|
| WO | 2016106171 | | 6/2016 |

OTHER PUBLICATIONS

Li, H., et al, "Ultraflexible and tailorable all-solid-state supercapacitors using polyacrylamide-based hydrogel electrolyte with high ionic conductivity", Nanoscale 9, 18474-18481 (2017).
Dong, L., et al, "Breathable and Wearable Energy Storage Based on Highly Flexible Paper Electrodes", Advanced Materials, 28, 9313-9319 (2016).
Sun, J.-Y., et al, "Highly stretchable and tough hydrogels", Nature 489, 133-136 (2012).
Luo, F., et al, "Oppositely Charged Polyelectrolytes Form Tough, Self-Healing, and Rebuildable Hydrogels", Advance Materials, 27, 2722-2727 (2015).

* cited by examiner

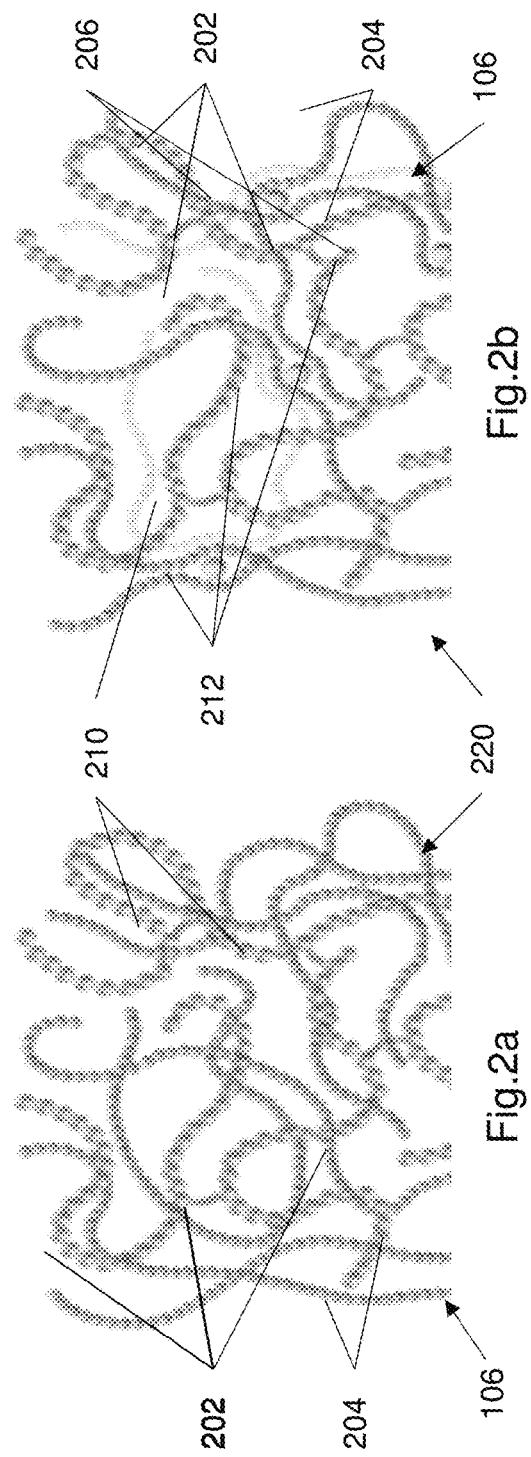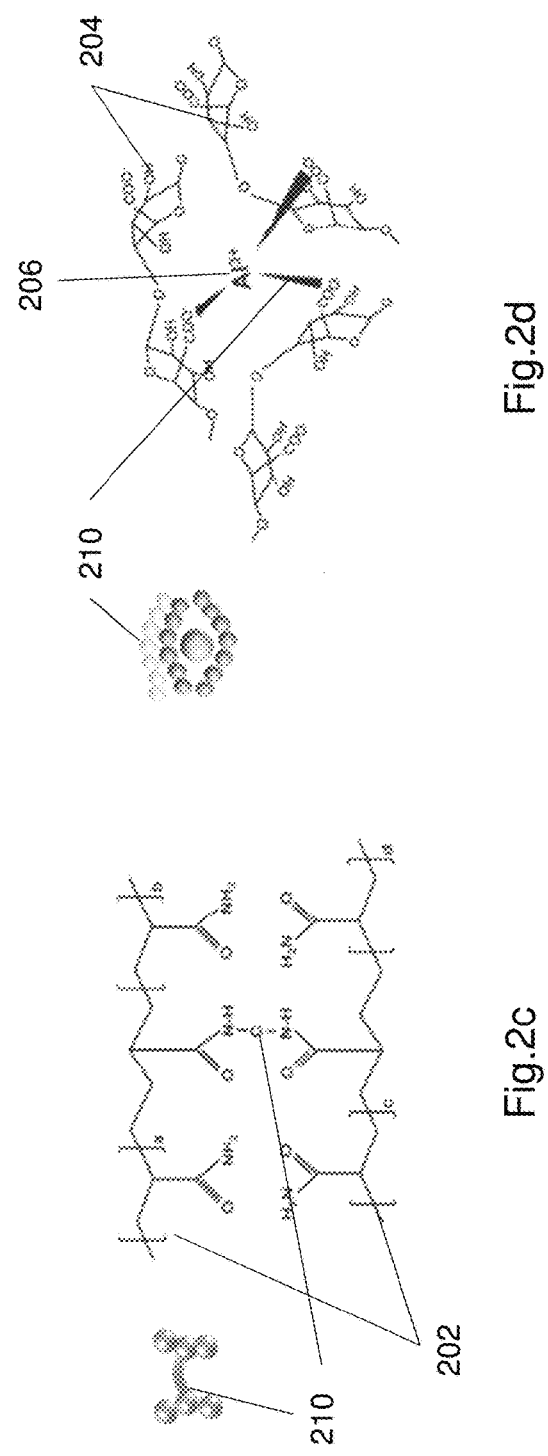
Fig.2a Fig.2b Fig.2c Fig.2d

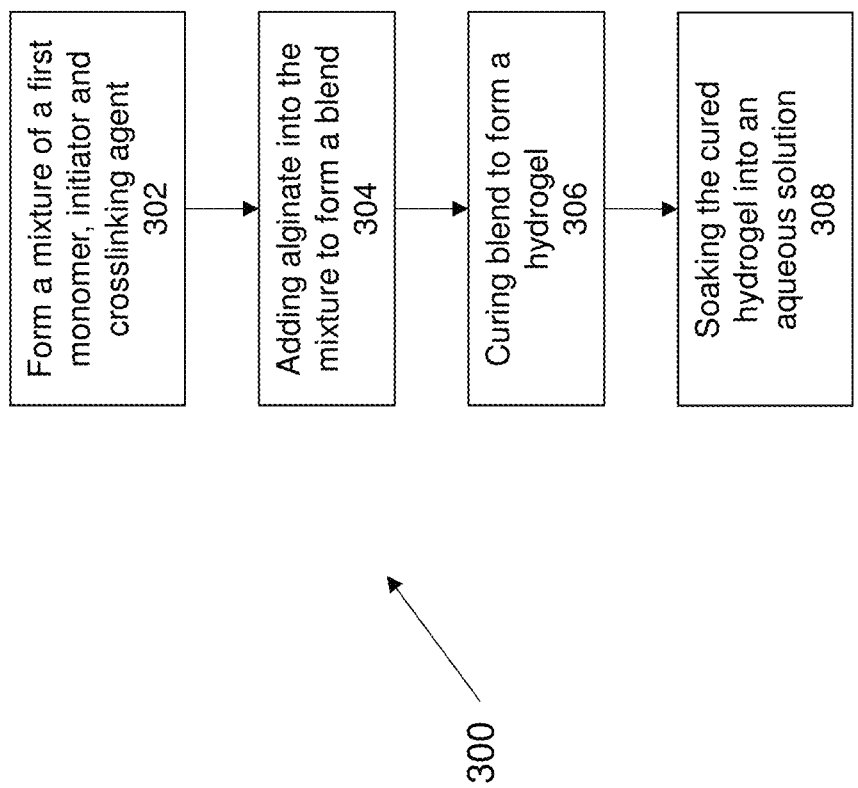

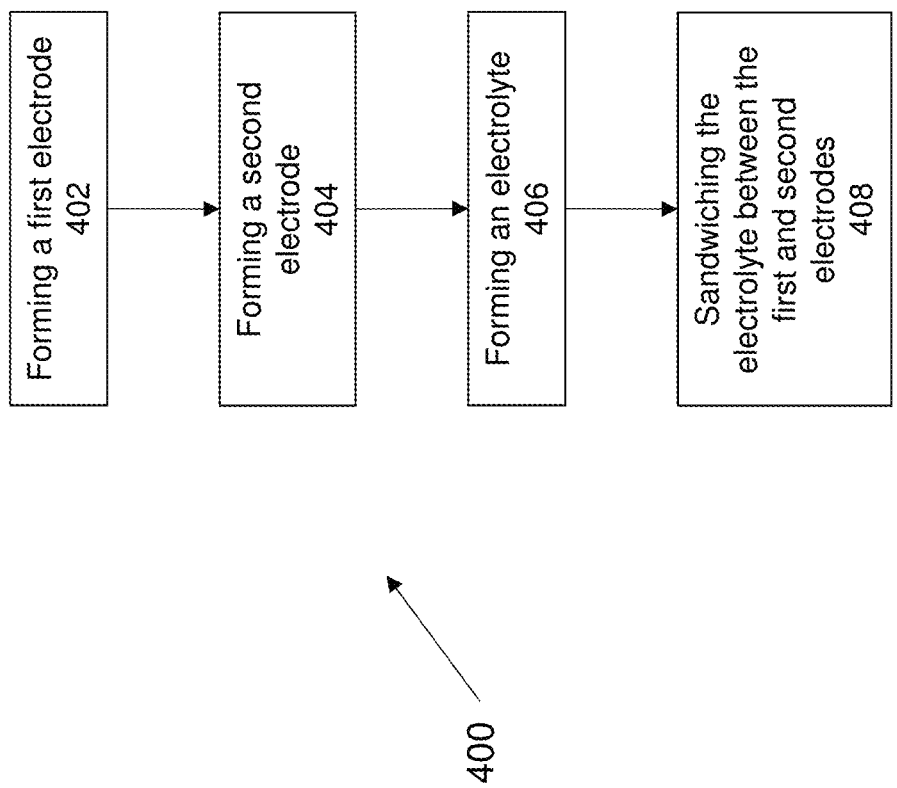

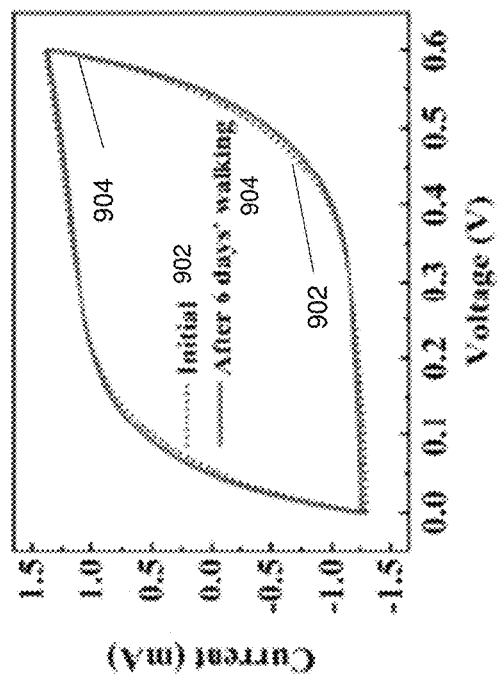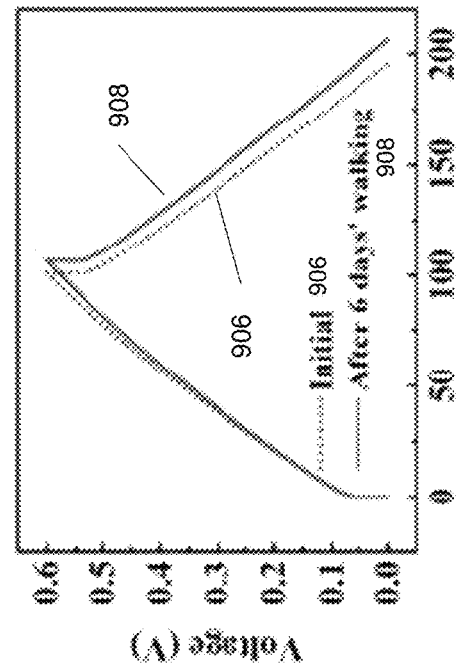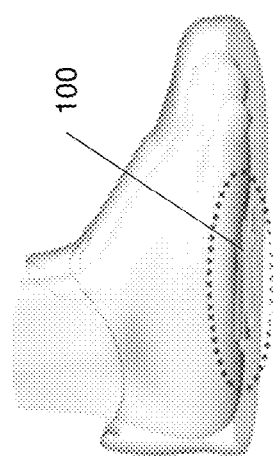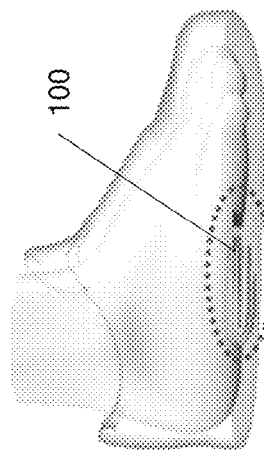
Fig.9c
Fig.9d
Fig.9a
Fig.9b

ROBUST ELECTRICAL COMPONENT AND AN ELECTROLYTE FOR USE IN AN ELECTRICAL COMPONENT

TECHNICAL FIELD

The present disclosure relates to an electrical component, in particular but not limited to a robust and flexible capacitor that can respond to mechanical loading. The present disclosure also relates to an electrolyte that can be used within an electrical component, in particular but not limited to an electrolyte that can be used within the robust and flexible electrical component.

BACKGROUND

Flexible and wearable devices are growing in use and are starting become more mainstream. Flexible and wearable devices are being incorporated into wearable products that are also starting to become more popular and are starting to gain wider usage.

A wearable energy source is a requirement for any wearable device. Wearable energy source devices has attracted tremendous attention due to the rapid development of wearable electronics. One commonly used example wearable power source is a supercapacitor. Supercapacitors are used for powering wearable devices due to their advantages of high power density, fast charge-discharge rate and long cycle life. Some particular batteries may also be used due to their fast charge-discharge rate and long cycle life.

Recently hydrogel electrolytes have been rapidly developed because of their capability to fulfil dual roles of an electrolyte and separator. The increasing need for flexible supercapacitors raises the requirements for hydrogel electrolytes with higher mechanical flexibility and robustness. However current hydrogel electrolytes prepared by current methods e.g. by mixing polymer aqueous solution with acid/alkaline/electrolyte salt are either brittle or poor in mechanical strength.

Current supercapacitors are generally not tough and can fail when these known supercapacitors are subjected to mechanical stimuli or mechanical forces. There is a need for electrical components e.g. supercapacitors that are robust and can withstand mechanical forces.

SUMMARY OF THE INVENTION

It is an object of the present invention to provide an electrical component that can respond to mechanical loading, or at least provide the public with a useful alternative.

Other objects of the invention (or inventions) may become apparent from the following description and drawings, which is given by way of example only.

The present disclosure generally relates to an integrated energy harvesting and storage system that is configured to harvest electrical energy from another source of energy and store electrical energy for supply to electronic components.

In accordance with a first aspect the present invention relates to an electrolyte for use in a supercapacitor comprising:

a hydrogel including a polymer matrix including at least two crosslinked structures;

an aqueous solution including the polymer matrix within the aqueous solution, and wherein the electrolyte can dissipate energy in response to mechanical loads.

In an embodiment the aqueous solution comprises at one salt or acid, and wherein the salt or acid has a concentration of 0.1M to 2M.

In an embodiment the two crosslink structures comprises a first crosslinked structure that includes covalently bonded structure and a second crosslinked structure that includes ionically bonded structure.

In an embodiment the first crosslinked structure comprises acrylamide in an amount of 5 wt % to 20 wt % based on the total amount of the hydrogel electrolyte and the second crosslinked structure comprises alginate in an amount of 0.5 wt % to 5 wt % based on the total amount of the hydrogel electrolyte.

In an embodiment the aqueous solution comprises a solution containing one or more ions selected from $Ca^{2+}$, $Mg^{2+}$, $Zn^{2+}$, $Al^{2+}$, $Fe^{2+}$ and wherein the concentration of the ions is between 0.01M to 0.5M.

In an embodiment the first crosslinked structure functions as a bridging structure and the second crosslinked structure is configured to dissipate energy from mechanical loads or mechanical stress exerted on the electrolyte, wherein the second cross linked structure dissipates energy by breaking bonds in the second crosslinked structure and reforming the broken bonds once the mechanical load or mechanical stress is removed.

In an embodiment the hydrogel is soaked within the aqueous solution, the aqueous solution comprises a crosslinking agent and wherein the hydrogel is soaked for a time between 5 min to 60 min.

In an embodiment the crosslinking agent is N,N'methylenebisacrylamide crosslinking agent.

In accordance with a second aspect the present invention relates to a supercapacitor comprising:

a pair of electrodes;

a hydrogel electrolyte located between the pair of electrodes, wherein the hydrogel electrolyte further comprises;

an aqueous electrolyte solution a polymer matrix including at least two crosslinking networks.

In an embodiment the flexible electrical component is a super capacitor.

In an embodiment each electrode comprises a current collector, active material, electrical conductive particles and one or more binders.

In an embodiment the current collector comprises at least one of carbon nanotube paper, carbon cloth, carbon paper or nickel foam.

In an embodiment the active material comprises polypyrrole (PPy), wherein the PPy is prepared by electrochemical deposition, and wherein the electrochemical deposition time can be 10-900 s.

In an embodiment the supercapacitor being obtained by sandwiching the hydrogel electrolyte between two electrodes, wherein the outer sides of the two electrodes being covered with the hydrogel electrolyte.

In an embodiment the aqueous solution of the hydrogel electrolyte comprises at least one salt or acid, wherein the at least one salt or acid has a concentration of 0.1M to 2M.

an embodiment the hydrogel electrolyte is formed by mixing gel monomer for the first network, polymer for the second network, initiator and crosslinking agent for the first network in deionized water and curing in room temperature or high temperature, then soaking with aqueous electrolyte solution, wherein the solution contains crosslinking agent for the second network.

In an embodiment the gel monomer for the first network comprises acrylamide in an amount of 5 wt % to 20 wt % based on the total amount of the hydrogel electrolyte, and wherein the polymer for the first network comprises alginate in an amount of 0.5 wt % to 5 wt % based on the total amount of the hydrogel electrolyte.

In an embodiment the crosslinking agent for the second network comprises a salt solution containing one ion selected from $Ca^{2+}$, $Mg^{2+}$, $Zn^{2+}$, $Al^{2+}$, $Fe^{2+}$ and wherein the concentration of the salt or acid within the solution is between 0.01M to 0.5M.

In accordance with a further aspect, the present invention relates to an electrical component comprising:

a first electrode and a second electrode, the first and second electrode being spaced apart from each other, an electrolyte disposed between the first electrode and the second electrode, wherein the electrolyte comprises a hydrogel including at least two crosslink structures and wherein the electrolyte can dissipate energy in response to mechanical loads.

In an embodiment the each of the first electrode and second electrode are electrically conductive plates.

In an embodiment the electrical component is a super capacitor.

In an embodiment each crosslink structure of the two crosslink structures comprises a single majority chemical bond.

In an embodiment the hydrogel comprises a covalently crosslinked structure and a ionically crosslinked structure.

In an embodiment the hydrogel electrolyte is configured to elastically deform or elastically flex in response to mechanical loads applied to the electrical component, while still maintaining capacitor function.

In an embodiment the ionically crosslinked structure configured to dissipate energy when the electrical component is subjected to mechanical loads by rupturing bonds within the ionically crosslinked structure, and further configured to restore bonds when the electrical component is unloaded.

In an embodiment the covlanently bonded crosslink is configured to provide a bridging structure and maintain the physical boundaries of the shape thereby preventing the electrolyte from separating or dissociating.

In an embodiment the first crosslinked structure is defined by a first polymer comprising an acrylamide and the second crosslinked structure is defined by an alginate.

In an embodiment the first polymer comprises a polyacrylamide (PAAm) that is covalently crosslinked to define the first network and the alginate comprises an 5 aluminium alginate (Al-alginate) that is ionically crosslinked to define the second network.

In an embodiment the aqueous solution comprises a crosslinking agent, wherein the crosslinking agent comprises a salt or acid within the aqueous solution.

In an embodiment the salt or acid being a solution within the aqueous solution, wherein the aqueous solution comprising one or more ions selected from a group of Calcium, Zinc, Magnesium, Iron or Aluminium.

In an embodiment the salt or acid comprising a concentration of 0.1M to 2M.

In an embodiment the first polymer comprising 5% weight to 20% weight of the total electrolyte, and the alginate comprising 0.5% weight to 5% weight of the total electrolyte.

In an embodiment each of the first and second electrodes comprises a current collector and an active material coupled to each other.

In an embodiment the current collector comprises a material from one of: carbon nanotube paper, carbon cloth, carbon paper, nickel foam.

In an embodiment the active material comprises polypyrrole (PPy) that is electrodeposited onto the current collector.

In an embodiment the hydrogel electrolyte is sandwiched between the first electrode and the second electrode, wherein each electrode comprises a proximal surface and a distal surface, wherein the proximal surfaces of each electrode are proximal to each other and face each other and the distal surfaces are distal to each other, and wherein the hydrogel electrolyte covers at least each proximal surface of each electrode.

In accordance with a further aspect, the present invention comprises a method of constructing an electrical component comprising the steps of:

forming a first electrode
forming a second electrode,
forming an electrolyte,
sandwiching the electrolyte between the first electrode and second electrode, wherein the electrolyte comprises a hydrogel including at least two crosslink structures and wherein the electrolyte can dissipate energy in response to mechanical loads.

In an embodiment the step of forming the electrolyte comprises the additional steps of:

forming a mixture of a first gel monomer, an initiator and a crosslinking agent in deionized water, adding an alginate into the mixture to form a blend, curing the blend at room temperature or a higher temperature, soaking the cured blend in an aqueous electrolyte solution.

In an embodiment the first and second electrode are formed by the steps of:

providing a carbon nanotube paper,
electrochemically depositing a polypyrrole (PPy) onto the carbon nanotube paper.

In accordance with a further aspect, the present invention relates to a method of forming a hydrogel for use in an electrical component to provide the electrical component with mechanical robustness, wherein method comprises the steps of: forming a mixture of a first gel monomer, an initiator and a crosslinking agent in deionized water, adding an alginate into the mixture to form a blend, curing the blend at room temperature or a higher temperature, soaking the cured blend in an aqueous electrolyte solution.

In an embodiment the electrolyte is a hydrogel that comprises a first covalently bonded network and a second ionic bonded network.

In an embodiment the first gel monomer is acrylamide monomer, the initiator is an ammonium persulphate and the crosslinking agent is N,N'-methylenebisacrylamide.

In an embodiment the aqueous electrolyte solution comprises $AlCl_3$ and $Li_2SO_4$.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

The term network as used herein means a grid or structure of one or more compound e.g. a polymer or a salt solution or any other compounds.

As used herein the term 'and/or' means 'and' or 'or', or where the context allows both.

The invention consists in the foregoing and also envisages constructions of which the following gives examples only. In the following description like numbers denote like features.

As used herein "(s)" following a noun means the plural and/or singular forms of the noun.

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that at least some embodiments may be described as a method (i.e. process) that is depicted as a flowchart, a flow diagram, a structure diagram, or a block diagram. Although a flowchart may describe the operations as a sequential method, many of the operations can be performed in parallel or concurrently. In addition, the order of the operations may be rearranged. A method (i.e. process) is terminated when its operations are completed.

In this specification, the word "comprising" and its variations, such as "comprises", has its usual meaning in accordance with International patent practice. That is, the word does not preclude additional or unrecited elements, substances or method steps, in addition to those specifically recited. Thus, the described apparatus, substance or method may have other elements, substances or steps in various embodiments. The term "comprising" (and its grammatical variations) as used herein are used in the inclusive sense of "having" or "including" and not in the sense of "consisting only of".

BRIEF DESCRIPTION OF THE DRAWINGS

Notwithstanding any other forms which may fall within the scope of the present disclosure, a preferred embodiment will now be described, by way of example only, with reference to the accompanying drawings in which:

FIG. 2a illustrates the covalently crosslinked structure within the electrolyte of the electrical component shown in FIG. 1a and FIG. 1b.

FIG. 2b shows ionically crosslinked structure within the electrolyte of the electrical component shown in FIG. 1a and FIG. 1b.

FIGS. 2c and 2d illustrate the chemical structure of the covalent crosslink and the ionic crosslink respectively.

FIG. 3 shows an embodiment of a method of forming the hydrogel electrolyte.

FIG. 4 shows an embodiment of a method of forming the electrical component incorporating the hydrogel electrolyte.

FIGS. 9a and 9b illustrate a further test that was performed on the supercapacitor, wherein the supercapacitor is applied to the base of a user's shoe.

FIGS. 9c and 9d illustrate CV and GCD curves of the supercapacitor following the test of FIGS. 9a and 9b.

FIGS. 10b and 10c illustrate CV and GCD curves of the supercapacitor following the test shown in FIG. 10a.

DETAILED DESCRIPTION OF THE PREFERRED EMBODIMENTS

Flexible electronics are have become commonly place and have a variety of applications in healthcare, military, and other applications. Flexible electronics are used in wearable electronic device components and devices (i.e. wearable electronics). Wearable electronics are used in the creation of smart fabrics. Devices including garments made with smart fabrics can be used in a variety of applications such as healthcare to replace bulky instruments and bulky electronic components.

One example of an energy storage device for wearable electronics are supercapacitors due to their advantages such as for example high power density, fast charge-discharge rates and a relatively longer life cycle than certain types of batteries. A general supercapacitor comprises a pair of electrodes, a current collector coupled to each electrode, a separator between the two electrodes and an electrolyte disposed between the two electrodes. Current known supercapacitors often use a hydrogel electrolyte. Currently manufactured supercapacitors have limited flexibility under bending and mechanical deformation at sharp angles. The bending and deformation (e.g. large shear forces, pressure, sharp cuts, sharp being angles) of these supercapacitors causes damage to the currently used hydrogel electrolytes and thereby can compromise the performance of the electrolyte and hence the performance of the supercapacitor.

Some known supercapacitors are designed to be stretchable to accommodate the mechanical deformations caused by the forces acting on the supercapacitor, and some stretchable gels are used as electrolyte are usually very notch sensitive, which means their stretchability and/or flexibility and strength decrease significantly once notches are induced. Eventual fracture is inevitable due to known supercapacitors and hydrogels being unable to accommodate large deformations or mechanical loads.

The present disclosure relates to an electrical component, in particular but not limited to a robust and flexible capacitor that can respond to mechanical loading. More particularly the electrical component is a supercapacitor that is substantially robust with minimal change in functionality in response to large mechanical loads (e.g. large shear loads, bending loads etc.). The present disclosure also relates to an electrolyte that can be used within an electrical component, in particular but not limited to an electrolyte that can be used within the robust and flexible electrical component. The electrolyte is constructed to be substantially flexible and tough such that the electrolyte also continues to function when exposed to large mechanical loads. The electrolyte is capable of dissipating energy exposed to the electrolyte due to the mechanical loads. The supercapacitor using such a hydrogel is a substantially flexible, tough and robust supercapacitor.

Figure 1A:
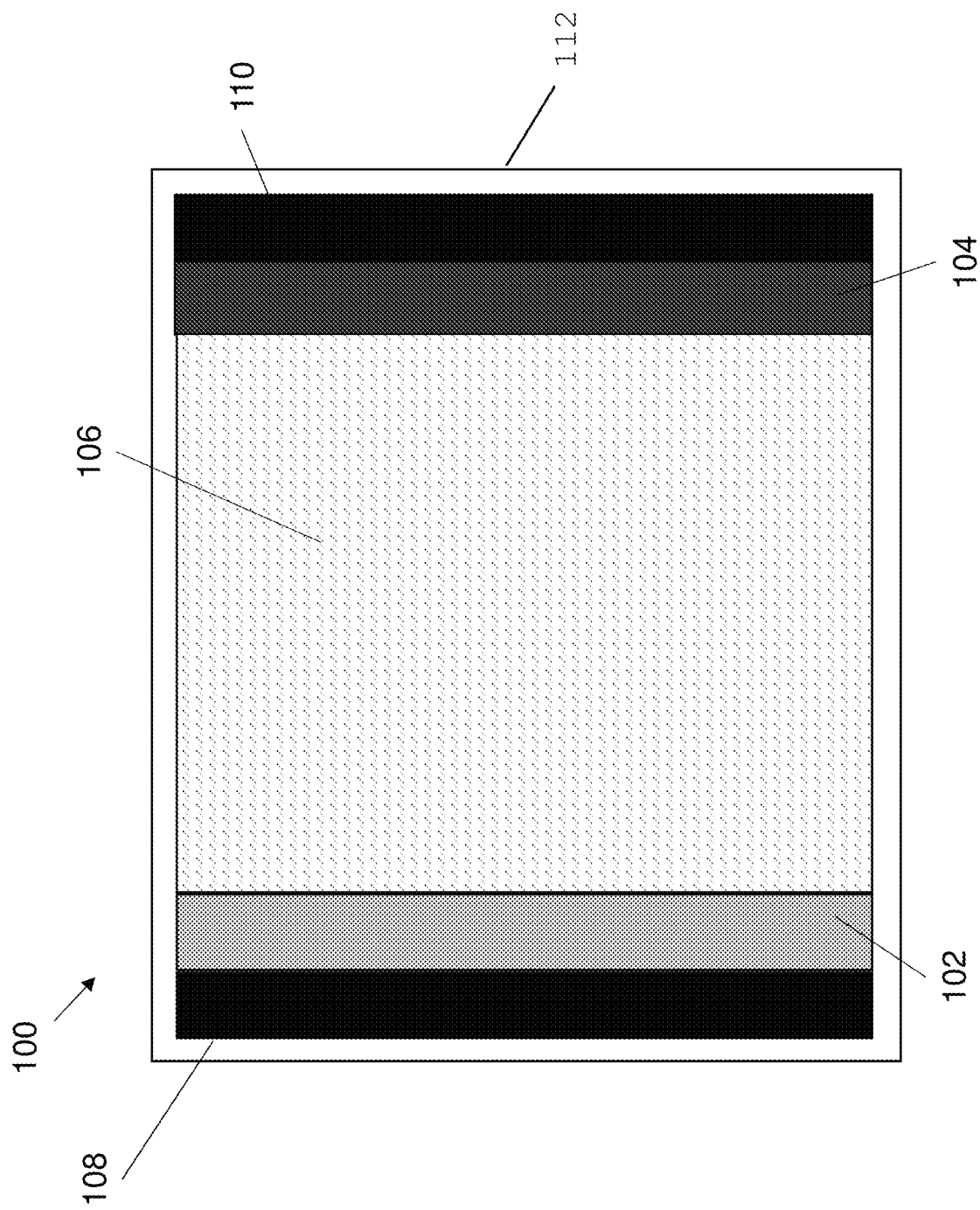
FIG. 1a illustrates an embodiment of an exemplary robust electrical component.

FIG. 1a shows an exemplary embodiment of a supercapacitor 100. Generally speaking the supercapacitor 100 comprises a first electrode 102, a second electrode 104 and an electrolyte 106 sandwiched between the first electrode and the second electrode. The supercapacitor 100 may optionally also include a first current collector 108 associated with the first electrode 102 and a second current collector 110 associated with the second electrode 104. The super capacitor 100 may also comprise a separator positioned between the first electrode and a second electrode to prevent a short circuit between the electrodes. The components of the supercapacitor 100 may be contained in a housing 112 formed of a suitable material e.g. plastics or epoxy.

The first and second electrodes 102, 104 are preferably similar in construction to each other. The first electrode 102 is coupled to the first current collector 108, and the second electrode 104 is coupled to the second current collector 110. Each electrode 102, 104 is preferably formed of an electrically conductive material. In one example each electrode comprises a polypyrrole (PPy) material. The polypyrrole (PPy) material is an active material of the electrode. Alternatively each electrode 102, 104 may be formed of a metal oxides or graphene or activated carbon or any other suitable material. Each current collector 108, 110 is also preferably formed from an electrically conductive material. Each current collector comprises a carbon nanotube paper. The carbon nanotube paper comprises a plurality of carbon nanotubes arranged on a sheet. The PPy material is electrochemically deposited onto the carbon nanotube paper (CNT), wherein the electrochemical deposition time can be anywhere between 10 seconds and 900 seconds. One or more binders may also be used to further improve the coupling of each electrode and current collector. The first electrode 102 and first current collector 108 are preferably coupled together to form a single unit. The second electrode 104 and the second current collector 110 are preferably coupled together to form a single unit.

The first and second electrodes 102, 104 are electrically conductive plates or sheets. The electrodes 102, 104 are preferably flexible. In one example configuration the supercapacitor 100 may comprise a first electrode 102 that positively charged (i.e. positively polarized), functioning as an anode and the second electrode 104 is preferably negatively charged (i.e. negatively polarized), functioning as a cathode. The arrangement of the anode and cathode may be reversible. In another alternative configuration the second electrode 104 may act as an anode and the first electrode 102 may act as a cathode. The supercapacitor may use any suitable energy storage principle e.g. electrostatic or electrochemical. The supercapacitor is preferably constructed accordingly.

The first electrode 102 and second electrode 104 are preferably formed as sheets or plates. The sheets or plates may be substantially flexible such that the electrodes 102, 104 may be formed into any suitable shape. As shown in FIG. 1 the supercapacitor 100 is a rectangular prism shape. Alternatively the supercapacitor 100 may comprise a cylinder shaped supercapacitor or a disc shape or any other suitable shape. The first and second electrodes 102, 104 may be substantially flexible.

The first electrode 102 and second electrode 104 plates or sheets comprise a proximal surface and a distal surface. The proximal surface of each of the electrodes 102, 104 wherein the proximal surfaces of each electrode are proximal to each other and face each other and the distal surfaces are distal to each other.

The electrolyte 106 is disposed between the first and second electrodes 102, 104. The electrolyte 106 is preferably a hydrogel electrolyte (i.e. a gel in which the liquid component is water or has water molecules within it). The hydrogel electrolyte 106 is a substantially viscous gel. The hydrogel electrolyte 106 is viscous enough to be formed into a shape and retain the shape it is formed into. For example the electrolyte may be formed into a ball or a sheet or any other suitable shape. The electrolyte 106 is also capable of being retained within the supercapacitor 100 by being sandwiched between the electrodes 102, 104.

The hydrogel electrolyte 106 functions as the separator within the supercapacitor 100. The hydrogel electrolyte 106 prevents short circuit between the two electrodes 102, 104. The hydrogel electrolyte 106 is disposed in contact with each of the electrodes 102, 104, wherein the hydrogel electrolyte covers at least the proximal sides of the electrodes 102, 104.

The hydrogel electrolyte is configured to elastically deform or elastically flex in response to mechanical loads applied to the electrical component 100, thereby allowing the supercapacitor 100 to maintain its functionality. The flexible electrodes 102, 104 and in particular the flexible hydrogel electrolyte 106 provide a robust, tough and highly flexible supercapacitor 100, with energy dissipative capability. The hydrogel electrolyte covering or coating each of the electrodes 102, 104, also protects the electrodes from external mechanical loading.

The hydrogel electrolyte 106 comprises at least two crosslink structures. The hydrogel electrolyte is configured to dissipate energy in response to mechanical loads and even large mechanical loads. The hydrogel electrolyte 106 may comprise a polymer matrix consisting two crosslinked networks (i.e. structures). Each crosslink network comprises a single type of chemical bond. The hydrogel electrolyte comprises a covalently crosslinked network (i.e. structure) and a ionically crosslinked network (i.e. structure).

The hydrogel electrolyte 106 comprises a covalently crosslinked polyacrylamide (PAAm) and ionically crosslinked alginate. The ionically crosslinked alginate is preferably Aluminium alginate (Al-alginate). The alginate forms a reversible network. The reversible Al-alginate network can dissipate energy upon stress loading (i.e. mechanical loads) through the rupture of physical bonds. The physical bonds are reformed when the stress loading is unloaded. The covalently bonded network provides a bridging structure i.e.

a bridging ability to maintain the physical boundaries of the electrolyte and prevents the electrolyte 106 from separating or dissociating.

The hydrogel electrolyte 106 may also include one or more crosslinking agents that may be added into the electrolyte. The PAAm chains are covalently bonded to each other. In one example the PAAm chains may also be covalently crosslinked by N,N'methylenebisacrylamide crosslinking agent with alginate chains that are randomly dispersed through the electrolyte 106. The hydrogel may be immersed into an aqueous solution containing a salt or acid. The solution preferably contains one or more ions within the solution, wherein the ions may be one or more of Calcium, Zinc, Magnesium, Iron or Aluminium. In one example the hydrogel electrolyte includes Aluminium ($Al^{3+}$) ions that form ionic crosslinks with the guluronic acid units (G blocks) in the different alginate chains. The ionic crosslinks result in the second network. As described earlier, the ionic crosslinks break and dissipate a energy when the supercapacitor is exposed to large mechanical loads, and the ionic crosslinks reform. This process of crosslinks breaking and reforming is highly reversible.

Figure 1B:
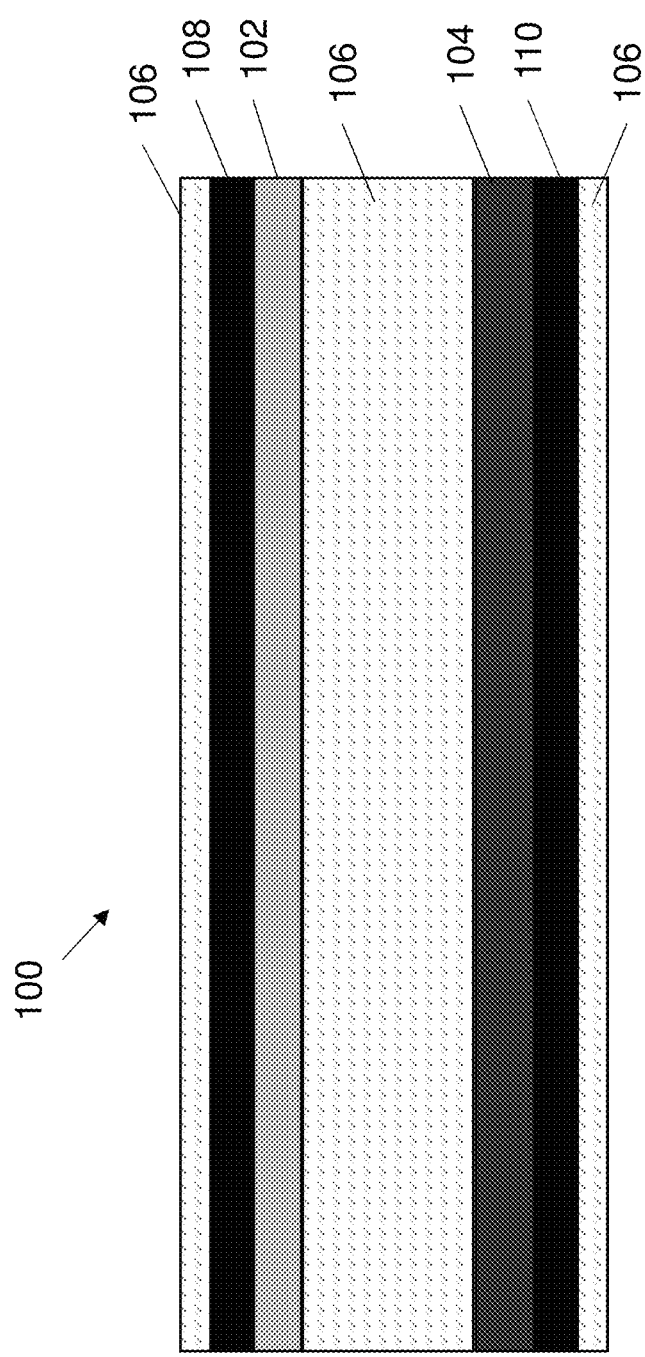
FIG. 1b illustrates a further configuration of a robust electrical component.

FIG. 1b shows a further configuration of the supercapacitor 100. The supercapacitor may comprise at least a first electrode 102 and a second electrode 104 that are in the form of thin flexible electrodes. In one example each electrode may be between 15 μm and 30 μm thick, preferably the electrode is between 20 μm and 25 μm thick. The electrolyte is sandwiched between the electrodes 102, 104. Each electrode is associated with a corresponding current collector 108 and 110 respectively. In this alternative configuration the electrode each electrode is considered to be the combined electrode and current collector. In this alternative construction the electrolyte 106 is also disposed on the outer sides (i.e. the side opposite the sandwiched electrolyte) of each electrode 102, 104. The electrolyte coats the distal surface of each electrode, resulting in a five layer structure. The electrolyte 106 coats the outer surface of each current collector. The multi-layer supercapacitor is substantially flexible and the electrodes are also protected from mechanical loads. The electrolyte coating the outer sides (i.e. distal surfaces) of each electrode also helps to conduct ions upon charging/discharging of the supercapacitor.

FIGS. 2a and 2b illustrate the structure of the hydrogel electrolyte 106 illustrating the two crosslinked networks (i.e. crosslinking structures) within the electrolyte 106. FIGS. 2a and 2b show the electrolyte including PAAm chains 202 mixed with alginate chains 204. The PAAm chains are chains of larger PAAm molecules as shown in FIGS. 2a and 2b. The alginate chains comprise smaller molecules as shown in FIGS. 2a and 2b. The PAAm and alginate maintain their individual structures, but together form a polymer matrix. The polymer matrix 220 comprises two crosslinking structures (i.e. two crosslinking networks).

FIG. 2a illustrates the covalent bonds between the PAAm chains within the electrolyte. The covalent bonds 210 are bonds between portions of the PAAm chains. FIG. 2b shows ionic crosslinking 212 (i.e. ionic bonds 212) between the Aluminium ions ($Al^{3+}$) 206 and alginate chains 204. FIGS. 2c and 2d illustrate the chemical structure of the covalent crosslink and the ionic crosslink respectively. The covalent bond 210 is shown in FIG. 2c. FIG. 2d illustrates the chemical structure of the ionic crosslink.

Figures 2E, 2F:
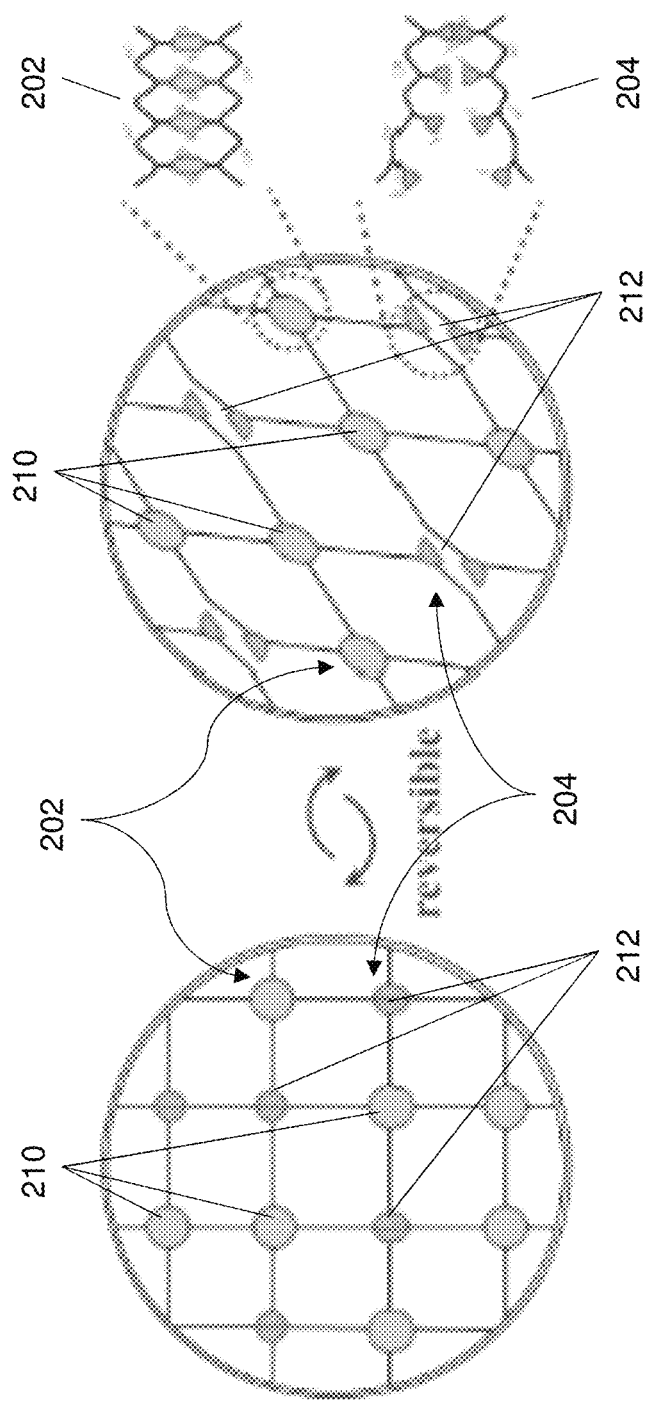
FIGS. 2e and 2f illustrate the energy dissipation mechanism of the hydrogel electrolyte

FIGS. 2e and 2f illustrate the energy dissipation mechanism of the hydrogel electrolyte 106. FIG. 2e illustrates the polymer matrix including the first crosslinking structure (i.e. covalently bonded structure) including a plurality of covalent bonds 210, and the second crosslinking structure (i.e. ionic bonded structure) including a plurality of ionic bonds 212. When the supercapacitor 100 is subjected to large stress loads, the ionic crosslinks break and dissipate the energy from the large stress loads. Upon unloading the supercapacitor 100 the crosslinks are reformed and the electrolyte recovers. The ionic crosslink network causes the ionic bonds to break in response to a mechanical load to dissipate the energy, and reform the ionic bonds when the mechanical load is removed.

The breaking and reforming of the ionic bonds is advantageous because the electrolyte 106 maintains its functionality in spite of the large mechanical loads. The covalent network 202 provides a bridging structure, since the covalent bonds remain intact in response to the mechanical load. The covalent bonds may be stretched but don't generally break thereby maintaining the structure of the hydrogel electrolyte and preventing the electrolyte from breaking down.

FIG. 3 shows an embodiment of a method 300 of forming the hydrogel electrolyte 106. The method commences at step 302. Step 302 comprises forming a mixture of a first gel monomer, an initiator and a crosslinking agent in deionized water. In one example formulation 5.815 g of acrylamide monomer is dissolved in 40 ml of deionized water and 28.6 mg ammonium persulphate and 3.5 mg N,N'-methylenebisacrylamide, serving as the initiator and crosslinking agent respectively were added to the deionized water and stirred for a time period. The time period is for example 30 mins.

Step 304 comprises adding an alginate into the mixture to form a blend. In this example 0.718 g alginate is added into the solution and may be vigorously stirred at room temperature to ensure dissolution.

Step 306 comprises curing the blend at room temperature or a higher temperature to form the hydrogel electrolyte. In this example, step 306 may also comprise the optional step of degassing by ultrasonic treatment and vacuum. The blend may be cured in moulds and may be cured at 60° C. for 2 hours in order to allow polymerization. This curing step produces an alginate/PAAm hydrogel where the alginate chains are randomly dispersed in the covalently crosslinked network of PAAm.

Step 308 comprises soaking the cured hydrogel into an aqueous solution in order to promote ion exchange. In this example the alginate/PAAm hydrogel is soaked in an aqueous mixture of 0.1M $AlCl_3$ and 1 M $Li_2SO_4$ at room temperature for at least an hour. This step results in a transparent, homogenous Al-alginate/PAAm hydrogel electrolyte consisting of covalently crosslinked PAAm structure (i.e. network) and ionically crosslinked Al-algniate structure (i.e. network).

FIG. 4 illustrates a method 400 of forming a robust electrical component. The robust electrical component is robust due to the presence of the Al-alginate/PAAm hydrogel electrolyte. The method 400 commences at step 402. Step 402 comprises forming a first electrode. Step 404 comprises forming a second electrode. Steps 402 and 404 may be performed simultaneously since the first and second electrodes are formed in substantially the same manner. Steps 402 and 404 for example comprise providing carbon nanotube paper (CNT) and electrochemically depositing polypyrrole (PPy) on the CNT papers at 0.8V for 10 minutes in an aqueous mixture of 0.1 M p-toluenesulfonic acid, 0.3M sodium p-toluenesulfonate and 0.5% pyrrole monomer. The CNT paper acts as the current collector and the electrode material of PPy is formed onto the CNT papers.

Steps 402 and 404 result in the CNT papers being coated with PPy after the electrodeposition.

Step 406 comprises forming an electrolyte. The electrolyte may be formed using any suitable method. In this embodiment the electrolyte is a Al-alginate/PAAm hydrogel. The electrolyte preferably is formed using the same steps as method 300 described earlier. The method steps of step 300 are included as part of method 400 (and not repeated for brevity).

Step 408 comprises sandwiching the electrolyte between the first electrode and the second electrode. The electrolyte comprises two crosslinked structures and wherein the electrolyte can dissipate energy in response mechanical loads, especially large mechanical loads.

As described earlier the electrolyte 106 comprises an Aluminium alginate/PAAm hydrogel. The hydrogel electrolyte 106 comprises a tensile modulus of 700 kPa to 900 kPa. More preferably the tensile modulus of the electrolyte 106 is between 750 kPa and 800 kPa. In one example composition of the electrolyte 106 comprising an Al-alginate/PAAm hydrogel comprises a tensile modulus of approximately 780.8 kPa. In contrast the tensile modulus of a standard alginate/PAAm hydrogel is around 2.4 kPa. A standard alginate/PAAm hydrogel is a known hydrogel but does not include the ionic network formed by the ions e.g. aluminium ions within the hydrogel of the invention i.e. the Al-alginate/PAAm hydrogel. The Al-alginate/PAAm hydrogel electrolyte 106 of the present invention can be stretched over 450% of its original length by hand. The hydrogel electrolyte 106 is highly stretchable and recoverable.

Figure 5:
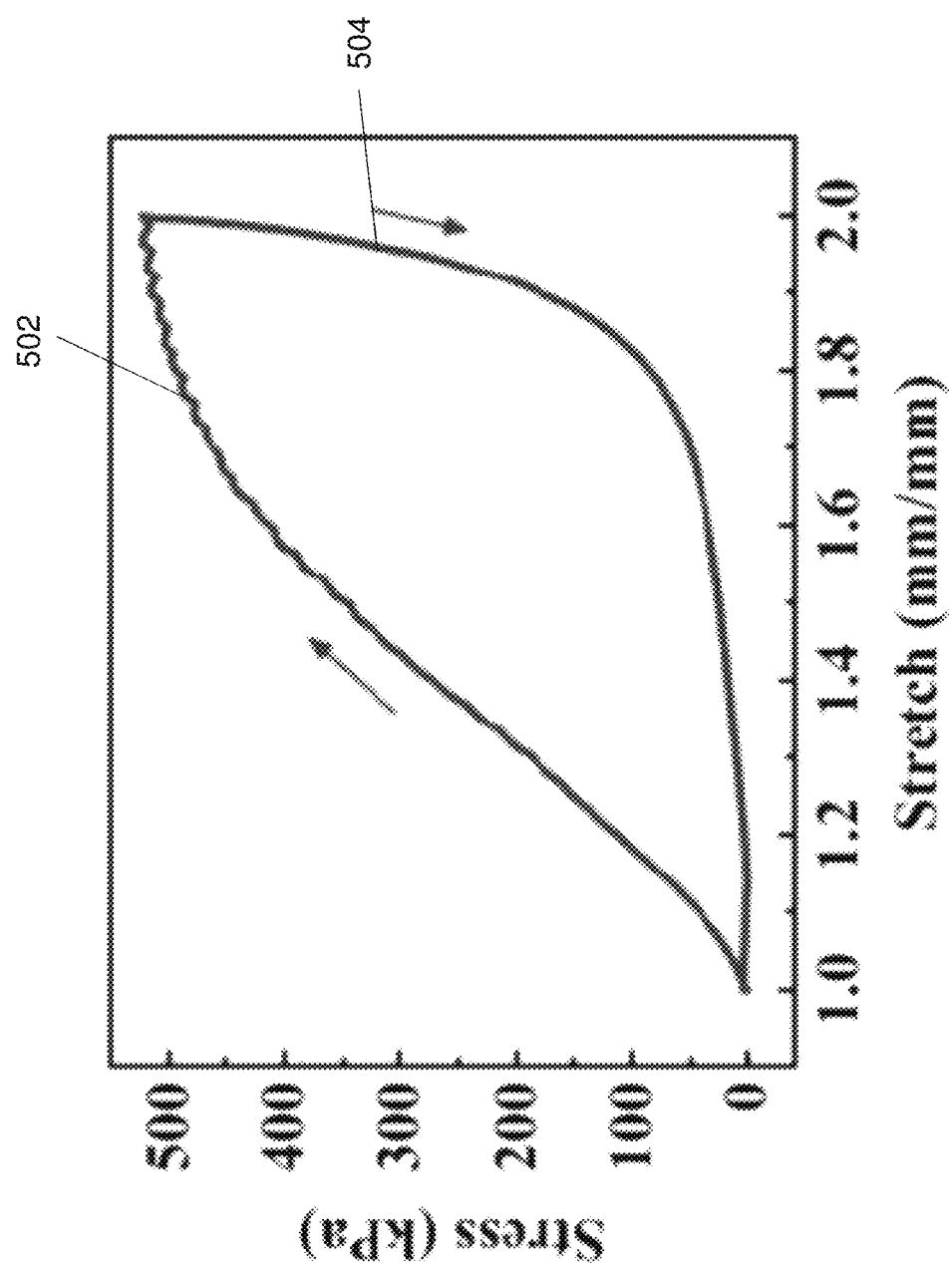
FIG. 5 shows the hysteresis curve of the Al-alginate/PAAm hydrogel electrolyte in response to mechanical loading and unloading.

The hydrogel electrolyte 106 dissipates energy much more effectively than other hydrogels. FIG. 5 shows the hysteresis curve of the Al-alginate/PAAm hydrogel electrolyte 106 in response to mechanical loading and unloading. FIG. 5 shows a loading curve 502 and an unloading curve 504. The area under the loading and unloading curves represents the energy dissipated in the cycle. As seen in FIG. 5, the energy dissipated in the cycle at a stretch of 2 mm is calculated to be as high as 250.6 kJm$^{-3}$. The large hysteresis and large amount of energy dissipated is attributed to the unzipping of the ionic bonds in the ionic structure (i.e. network). The covalent bonds in the covalent network provide a bridging function to ensure the hydrogel does not completely breakdown or dissociate. The bridging function from the covalently bonded structure (i.e. network) and the breaking/reforming of the ionic bonds in the ionically bonded structure (i.e. network) results in an electrolyte that has greatly enhanced mechanical properties.

Figure 6B:
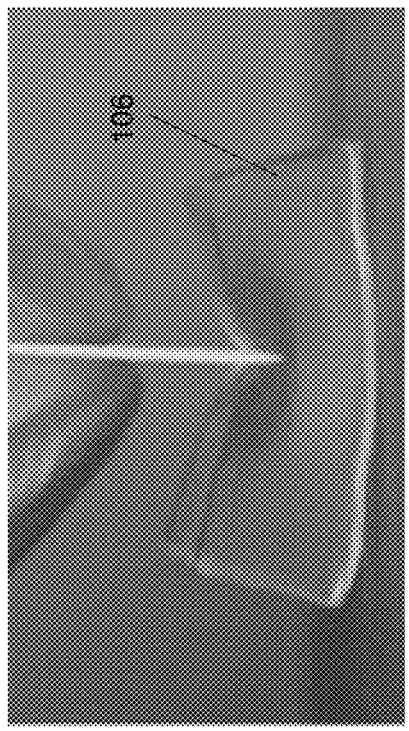
FIGS. 6a to 6d illustrate images of the hydrogel electrolyte being cut as part of the testing conducted.
Figure 6C:
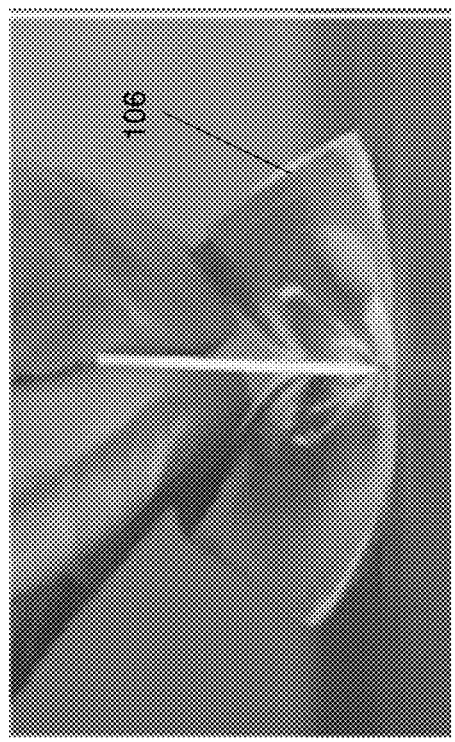
Figure 6A:
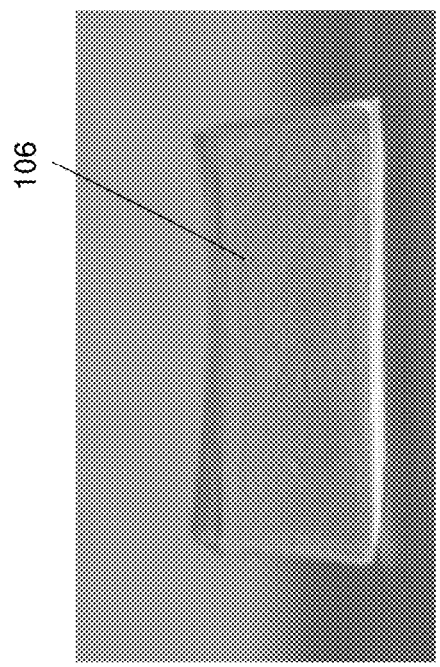
Figure 6D:
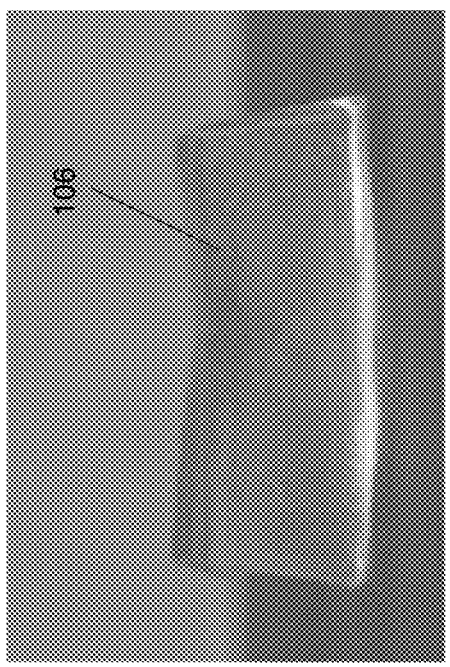

FIGS. 6a-6d illustrate images of the hydrogel electrolyte 106 being cut as part of the testing conducted. FIGS. 6a-6d demonstrate the enhanced mechanical properties of the hydrogel electrolyte 106, and the energy dissipation of the hydrogel in operation. FIG. 6a shows the hydrogel as rest. FIGS. 6b and 6c show a deep cut being inflicted in the hydrogel. The hydrogel is cut from top to the bottom, as shown in FIGS. 6b to 6c. The hydrogel is able to dissipate the energy from the mechanical load of the cut. The hydrogel fully recovers its original shape with no visible scar after removing the blade, as shown in FIG. 6d. This is possible due to the energy dissipation that occurs due to the ionic bonds breaking and then reforming. The covalently bonded structure provides a bridging structure to cause the hydrogel to recover to its original shape.

The electrical component as described herein (i.e. the supercapacitor 100) is electrochemically stable against dynamic deformations. FIGS. 7a to 7f illustrate various GCD curves (i.e. galvanostatic charge/discharge curves) of the supercapacitor 100 in response to various deformation applied to the supercapacitor. FIGS. 7a to 7f are GCD curves generated during testing of the supercapacitor 100.

Figure 7A:
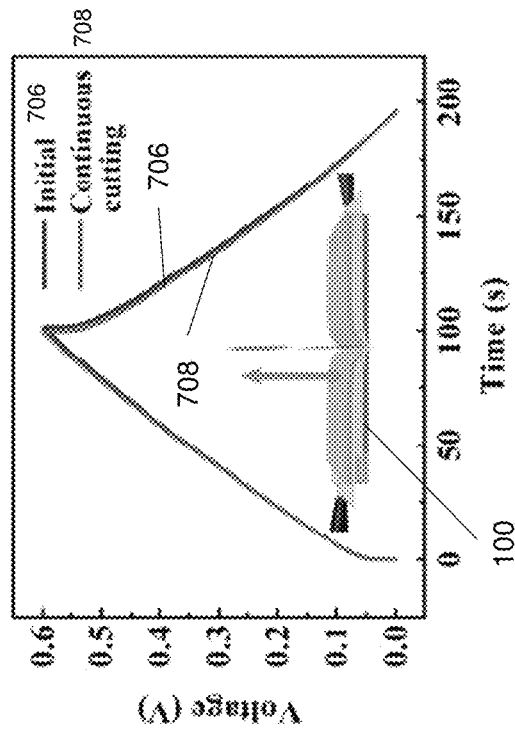
FIGS. 7a to 7f illustrate various GCD curves (i.e. galvanostatic charge/discharge curves) of the supercapacitor in response to various deformation applied to the supercapacitor.

FIG. 7a shows a GCD curve of the supercapacitor 100 when varying cutting forces are applied. The cutting forces are varied from approximately 9.8N to 29.4N, as seen on the GCD curve. The cuts were applied by a blade at varying forces. FIG. 7a illustrates an initial GCD curve with no mechanical loads, curve 702. The resultant GCD curve 704, in light of the cuts is shown as being overlaid on the initial GCD curve. As seen in FIG. 7a there is almost no deviation from the initial GCD curve. The two GCD curves 702, 704 are virtually identical meaning that there is no change in function of the electrical component 100 when exposed to mechanical loads.

Figure 7B:
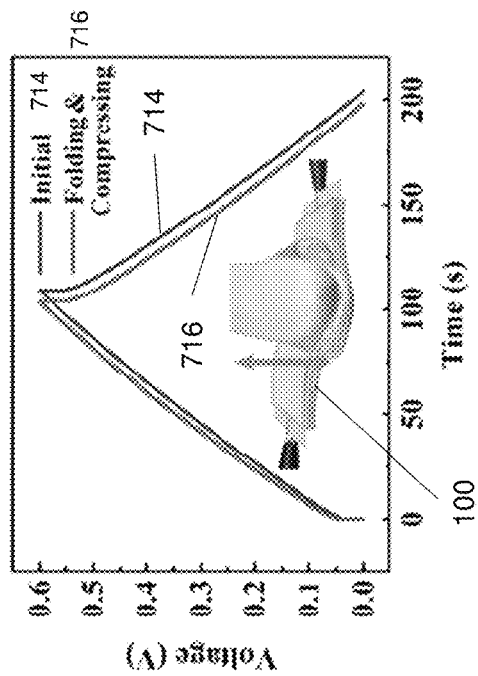

FIG. 7b shows a plot of the initial GCD curve 706 and a GCD curve 708 when the supercapacitor 100 is exposed to a continuous cut operation. FIG. 7b shows the continuous cut applied to the supercapacitor on the graph. As can be seen on FIG. 7b there is negligible difference between the curves 706 and 708 thereby illustrating no difference in operation in light of the cutting. FIG. 7b illustrates that the supercapacitor 100 is robust and indicates energy dissipation.

Figure 7C:
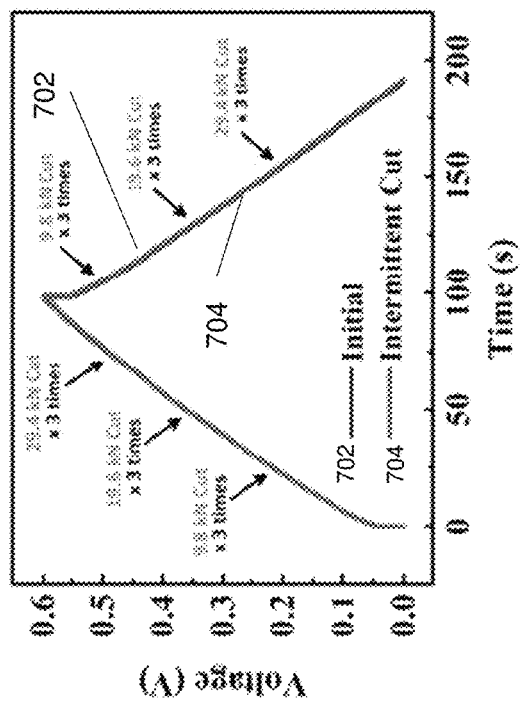

FIG. 7c shows a plot of an initial GCD curve 710 and a GCD curve 712 when the supercapacitor 100 is squeezed. The squeezing was performed by the tester's hands. FIG. 7c shows that curves 710 and 712 are almost identical indicating the supercapacitor 100 can dissipate energy from squeezing without changing the operation of the supercapacitor.

Figure 7D:
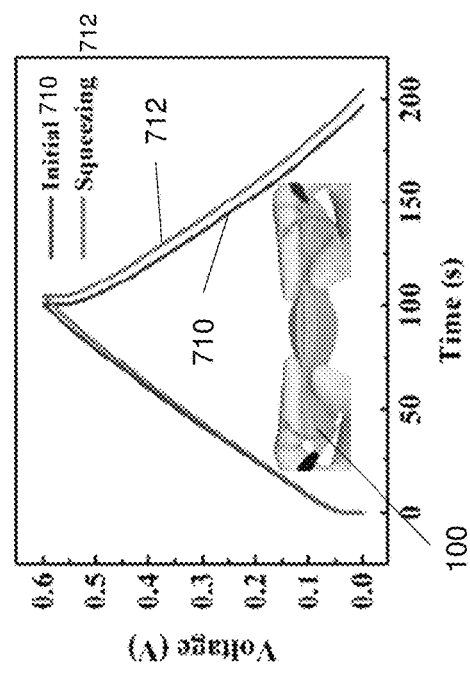

FIG. 7d shows a plot of an initial GCD curve 714 and a GCD curve 716 when the supercapacitor 100 is folded and compressed. FIG. 7d shows that the curves 714, 716 are almost identical again illustrating the supercapacitor 100 can dissipate energy when folded and compressed. The supercapacitor 100 maintains its operation when folded and compressed.

Figure 7E:
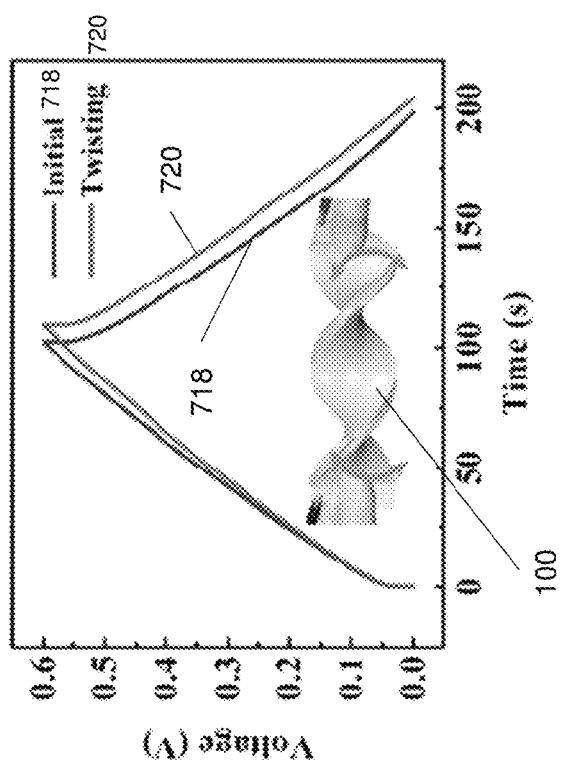

FIG. 7e shows a plot of an initial GCD curve 718 and a GCD curve 720 when the supercapacitor is twisted. The supercapacitor was twisted along a longitudinal axis by hand. Once again there is negligible difference between the GCD curves 718 and 720 thereby illustrating the energy dissipation properties of the supercapacitor, and the hydrogel electrolyte used within the supercapacitor.

Figure 7F:
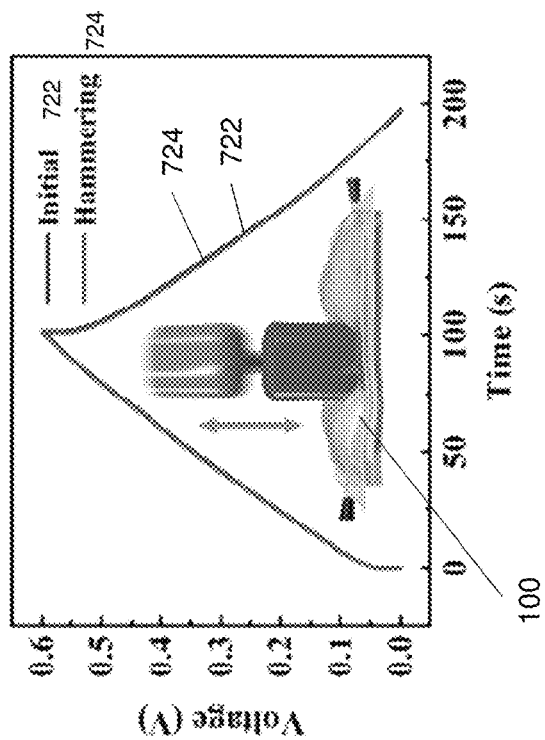

FIG. 7f shows an initial GCD curve 722 and a GCD curve 724 when the supercapacitor 100 is hammered using a mallet. This shown in the plot. Again as seen in FIG. 7, the plots 722 and 724 are almost identical to each other. This shows that the supercapacitor 100 does not change its operation or functionality due to large impact loads. The operation of the supercapacitor does not change because the hydrogel electrolyte 106 dissipates the mechanical energy and preventing the energy from being transmitted to the elements of the supercapacitor.

FIG. 7a to 7f show that the supercapacitor 100 can dissipate energy from a variety of different mechanical deformations. The FIGS. 7a to 7f were obtained at a current density of 0.5 mA cm$^{-2}$. The supercapacitor 100 does not compromise operation when exposed to dynamic mechanical loads. The hydrogel electrolyte 106 provides the function of dissipating energy from mechanical loads and/or deformations without affecting the position, condition and operation of the other supercapacitor components. The other components of the supercapacitor are not exposed to these loads since the electrolyte 106 dissipates the energy, hence maintaining the function of the supercapacitor 100.

Figure 7G:
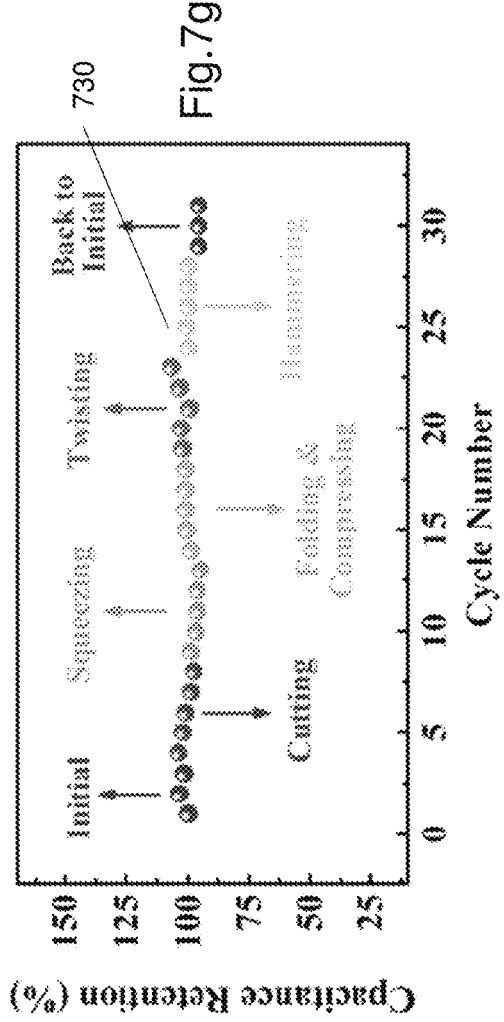
FIG. 7g illustrates a curve of capacitance retentions of the supercapacitor under various mechanical stimuli.

FIG. 7g illustrates a curve of capacitance retentions of the supercapacitor under various mechanical stimuli. Curve 730 of FIG. 7g remains substantially constant under various mechanical loads. Curve 730 illustrates that almost 100% capacitance retention is achieved even when the supercapacitor 100 is exposed to various mechanical loads or deformations. The supercapacitor 100 is a highly stable and robust component. The hydrogel electrolyte 106 is configured to dissipate energy from even when the mechanical load may be applied to a concentrated zone, and the electrolyte 106 reduces any stress induced on the electrodes 102, 104, thereby protecting the electrodes but also maintaining the functionality of the supercapacitor 100.

Figure 8A:
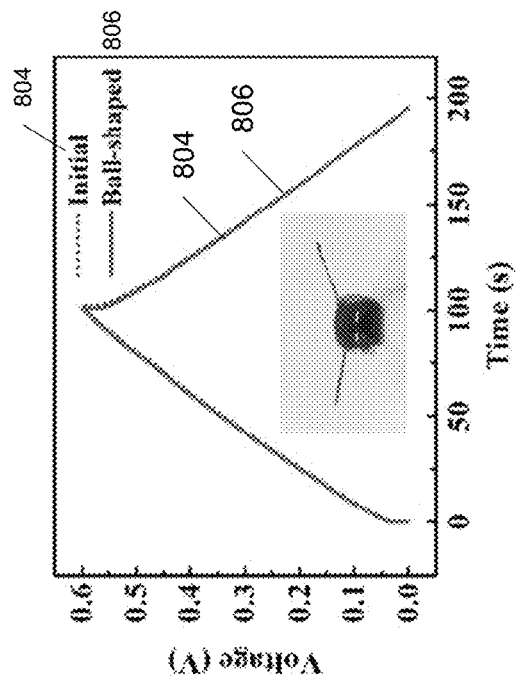
FIGS. 8a to 8d illustrate GCD curves of the supercapacitor when the supercapacitor is deformed into a new shape.

The supercapacitor 100 as described herein is substantially flexible such that it can be deformed into a different shape without any major loss in functionality. This can be achieved due to the hydrogel electrolyte being flexible and deformable and dissipating energy due to the deformation. FIGS. 8a to 8d illustrate GCD curves of the supercapacitor 100 when the supercapacitor is deformed into a new shape. FIG. 8a illustrates a GCD curve 802 of the supercapacitor 100 when the supercapacitor is in its standard planar configuration. Curve 802 is the initial curve.

Figure 8B:
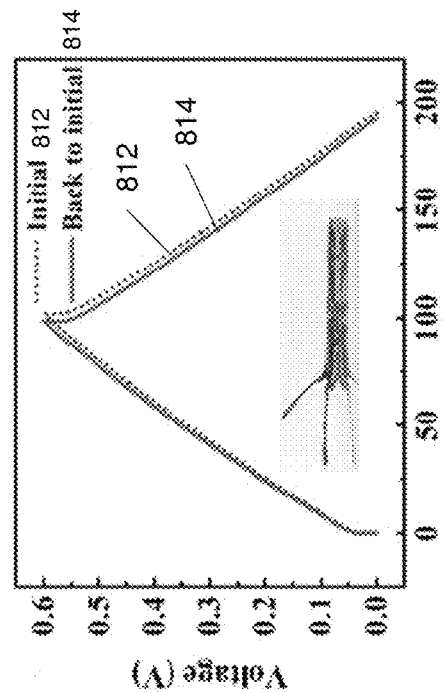
Figure 8C:
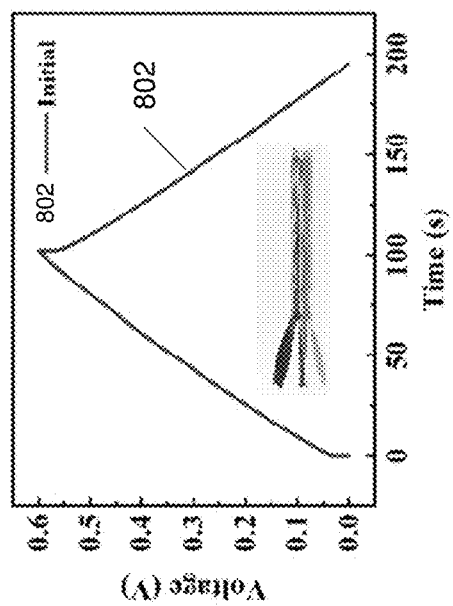
Figure 8D:
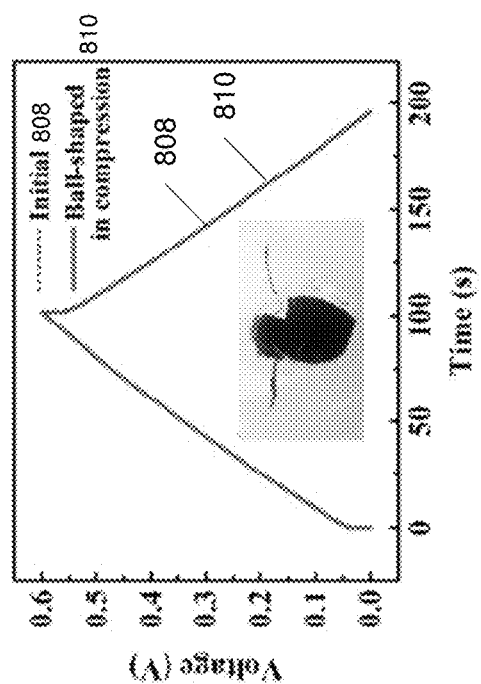

FIG. 8b shows a pair of GCD curves 804 and 806. The curve 804 corresponds to the initial curve i.e. curve 802. Curve 806 corresponds to a GCD curve of the supercapacitor 100 when the supercapacitor is kneaded into a ball. FIG. 8c shows a pair of GCD curves 808, 810 when the ball shaped supercapacitor 100 is further compressed. Curve 808 is the original GCD curve corresponding to curve 802. The curve 810 is the GCD curve when the ball shaped supercapacitor is further compressed. Again FIG. 8c illustrates that the two curves 808, 810 have negligible difference. FIG. 8d shows GCD curves 812, 814 for the supercapacitor 100 when it is restored to a planar configuration, as shown in FIG. 8d. The curve 812 corresponds to the initial GCD curve 802. Curve 814 is the GCD curve of the supercapacitor 100 when it is restored back to the planar configuration. Again FIG. 8d shows that the curves 812, 814 are almost identical thereby illustrating no degradation in performance when the supercapacitor is deformed or changes shape. This is achieved due to the efficient energy dissipation by the hydrogel electrolyte 106.

FIGS. 9a and 9b illustrate a further test that was performed on the supercapacitor 100. FIG. 9a shows the supercapacitor 100 being applied to the bottom of a person's shoe in a flat configuration. FIG. 9b shows the supercapacitor 100 being applied to the bottom of a person's shoe in a folded configuration. FIG. 9c shows a CV curve to characterise the performance of the supercapacitor. Curve 902 in FIG. 9c is an initial CV curve when the supercapacitor 100 is at rest. Curve 904 in FIG. 9c is a CV curve of the supercapacitor 100 after 6 days of walking. The supercapacitor may be flat for 3 days and folded for 3 days (total of 6 days of walking). The CV curve 904 is substantially identical if the supercapacitor 100 is in a flat or folded configuration. As shown in FIG. 9c, the CV curves are almost identical to each other. FIG. 9d shows a pair of GCD curves 906, 908. The curve 906 is an initial GCD curve when the supercapacitor is at rest, while curve 908 is a GCD curve of the supercapacitor 100 after 6 days of walking on it. Again as shown in FIG. 9d the curves 906 and 908 are almost identical indicating negligible change in performance of the supercapacitor even when it is walked on for 6 days.

Figure 10B:
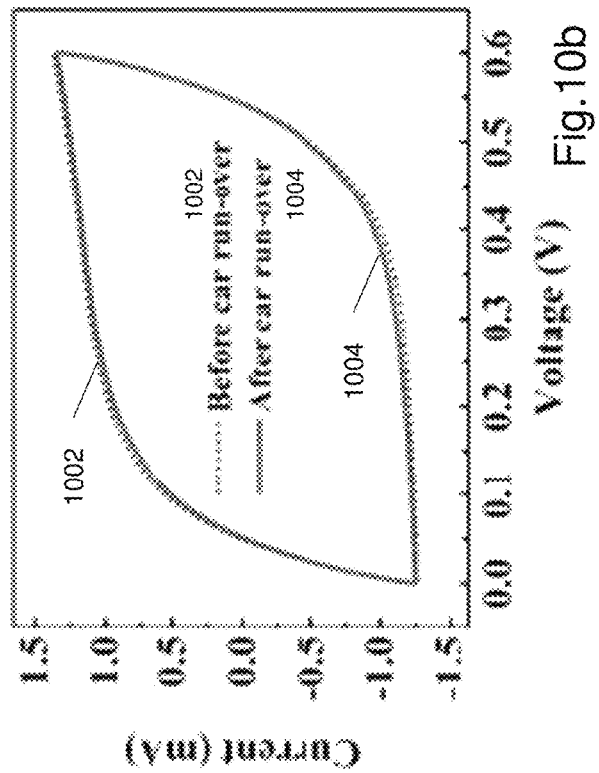
Figure 10A:
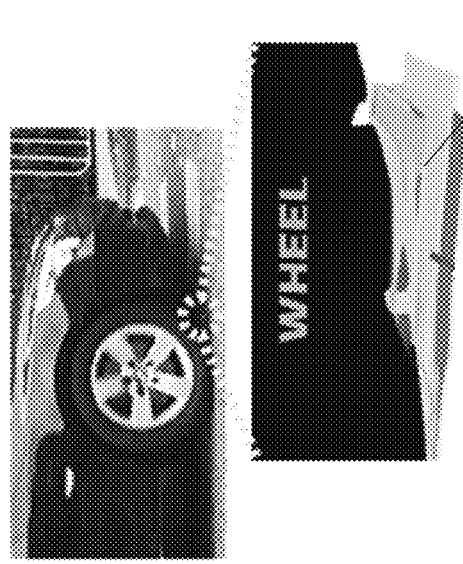
FIG. 10a shows a further test performed for the supercapacitor, wherein the supercapacitor is run over by a car.
Figure 10C:
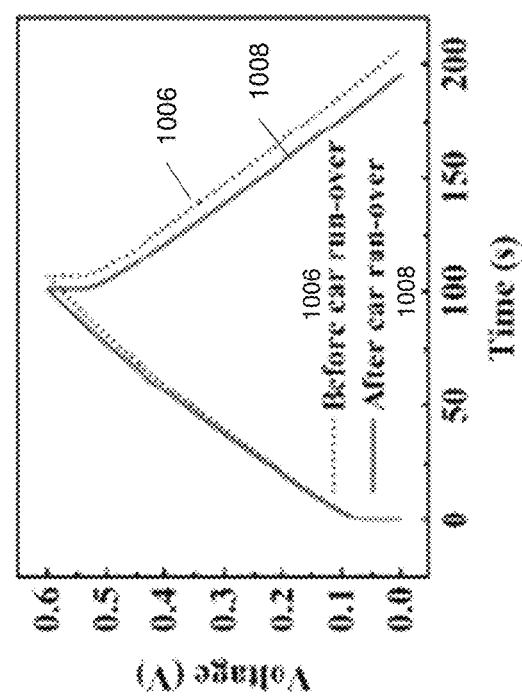

Similarly FIG. 10a shows a further test performed for the supercapacitor 100. The supercapacitor was positioned on a portion of a road and then driven over by a car. FIG. 10b shows CV curves of the supercapacitor 100 prior to being run over and after being run over. Curve 1002 corresponds to the CV curve prior to being run over. Curve 1004 corresponds to the CV curve after being run over. Curves 1002 and 1004 are similar in shape and there is negligible difference. FIG. 10c illustrates GCD curves 1006, 1008. Curve 1006 is a GCD curve of the supercapacitor prior to being run over by the car. Curve 1008 is a GCD curve of the supercapacitor after being run over. Again as seen from FIG. 10c the curves 1006, 1008 are almost identical to each other with negligible difference.

FIGS. 9c, 9d, 10b and 10c illustrate that the supercapacitor 100 does not degrade in performance even when exposed to large mechanical loads. The hydrogel electrolyte 106 does can dissipate large loads because of the ionically bonded structure breaking the ionic bonds and reforming the ionic bonds, and the covalently bonded structure maintaining the covalent bonds even when the supercapacitor 100 is exposed to mechanical loads.

The electrical component 100 e.g. the supercapacitor as described herein is very robust and has high mechanical strength and fracture toughness. The Al-alginate/PAAm hydrogel electrolyte as described herein also exhibits high mechanical strength and fracture toughness. The bridging effect provided by the covalent structure (i.e. covalent network) and the hysteresis of the ionic structure (i.e. ionic network) makes the notch insensitive, exhibits energy dissipation and exhibits mechanical toughness and robustness. The hydrogel electrolyte used within an electrical component provides the electrical component that can be used in various applications e.g. in wearable applications involving severe deformations or large mechanical loads.

The electrical component as described herein is a supercapacitor. It should be understood that the hydrogel electrolyte may be used in or applied to other electrical components such as capacitors (e.g. electrolytic capacitors), batteries, cells, fuel cells, hygrometers or other electrical components. The hydrogel electrolyte as used is particularly useful in capacitors or batteries to provide these electrical components flexibility and robustness against large mechanical loads.

The hydrogel electrolyte based capacitor is advantageous because it exhibits high flexibility, and can be dynamically bent at different angles repeatedly without noticeable capacity decay or noticeable compromise in performance of the supercapacitor 100. The supercapacitor 100 (and the hydrogel electrolyte 106) can also sustain various deformations including being dynamically squeezed, folded, compressed and twisted.

Due to the effective energy dissipation by the electrolyte 106, the electrochemical performance of the supercapacitor is generally unaffected even when the supercapacitor experiences large mechanical loads e.g. catastrophic mechanical impact of a blade cut or hammering. The flexible supercapacitor can also be kneaded from a flat planar shape into a compressed ball.

The hydrogel electrolyte as described is also advantageous because it covers at least one surface of each electrode. In some configurations the electrodes may be completely covered by the electrolyte. The electrolyte protects the electrodes from sharp mechanical forces due to the energy dissipation functionality of the hydrogel electrolyte. This prevents damage to the electrodes and also helps to maintain functionality of the supercapacitor in the presence of large mechanical loads. The structure of the hydrogel used in the electrolyte also helps to maintain a separation between the electrodes to avoid short circuit under high mechanical loads.

The supercapacitor as described herein, incorporating the Al-alginate/PAAm hydrogel as an electrolyte is further advantageous because it demonstrates good cycle stability with no obvious capacitance decay after a number of cycles, e.g. at least 3000 cycles. Further the supercapacitor does not lose function i.e. capacitance even when exposed to large mechanical loads such as large tensile or compressive forces or bending or twisting.

The electrodes being formed of carbon nanotube paper provide flexibility since the carbon nanotube paper is flexible. Further the hydrogel electrolyte as used is also stretchable. The combination of these two elements makes the supercapacitor highly flexible and therefore improves usability and increases the fields of use. For example such a supercapacitor can be used as a power supply for flexible electronics as it can be bent, stretched, twisted without any performance degradation.

The description of any of these alternative embodiments is considered exemplary. Any of the alternative embodiments and features in the alternative embodiments can be used in combination with each other or with the embodiments described with respect to the figures.

The foregoing describes only a preferred embodiment of the present invention and modifications, obvious to those skilled in the art, can be made thereto without departing from the scope of the present invention. While the invention has been described with reference to a number of preferred embodiments it should be appreciated that the invention can be embodied in many other forms.

The invention claimed is:

1. An electrolyte for use in a supercapacitor comprising:
a hydrogel including a polymer matrix including a first crosslinked structure and a second crosslinked structure; and
an aqueous solution including the polymer matrix within the aqueous solution wherein the aqueous solution includes an ionic crosslinking agent including one or more ions that interact with the second crosslinked structure, wherein the first crosslinked structure includes a covalently bonded structure defined by a plurality of acrylamide chains forming at least one covalent bond with each other, wherein the second crosslinked structure includes an ionically bonded structure defined by a plurality of alginate chains forming at least one ionic bond with the ionic crosslinking agent, and wherein the first and the second crosslinked structures are arranged to cooperatively dissipate energy in response to mechanical loads applied onto the electrolyte such that electrochemical performance of the supercapacitor remains substantially unchanged upon the mechanical loads are applied and removed.

2. The electrolyte for use in a supercapacitor in accordance with claim 1, wherein the aqueous solution comprises at least one salt or acid, and wherein the at least one salt or acid has a concentration of 0.1M to 2M.

3. The electrolyte for use in a supercapacitor in accordance with claim 1, wherein the acrylamide of the first crosslinked structure comprises an amount of 5 wt % to 20 wt % based on a total amount of the hydrogel and the alginate of the second crosslinked structure comprises an amount of 0.5 wt % to 5 wt % based on the total amount of the hydrogel.

4. The electrolyte for use in a supercapacitor in accordance with claim 1, wherein the one or more ions is selected from $Ca^{2+}$, $Mg^{2+}$, $Zn^{2+}$, $Al^{2+}$, $Fe^{2+}$ and wherein a concentration of the one or more ions is between 0.01M to 0.5M.

5. The electrolyte for use in a supercapacitor in accordance with claim 1, wherein the first crosslinked structure functions as a bridging structure and the second crosslinked structure is configured to dissipate energy from mechanical loads or mechanical stress exerted on the electrolyte, wherein the second crosslinked structure dissipates energy by breaking bonds in the second crosslinked structure and reforming the broken bonds once the mechanical loads or mechanical stress is removed.

6. The electrolyte for use in a supercapacitor in accordance with claim 1, wherein the electrolyte is prepared by soaking the hydrogel within an aqueous solution containing the ionic crosslinking agent for a time between 5 min to 60 min.

7. The electrolyte for use in a supercapacitor in accordance with claim 6, wherein the ionic crosslinking agent is $Al_2Cl_3$.

8. A supercapacitor comprising:
a pair of electrodes; and
a hydrogel electrolyte located between the pair of electrodes, the hydrogel electrolyte comprising:
a polymer matrix including a first crosslinked structure and a second crosslinked structure; and an aqueous electrolyte solution including a polymer matrix within the aqueous electrolyte solution, wherein the aqueous electrolyte solution includes an ionic crosslinking agent including one or more ions that interact with the second crosslinked structure, wherein the first crosslinked structure includes a covalently bonded structure defined by a plurality of acrylamide chains forming at least one covalent bond with each other, wherein the second crosslinked structure includes an ionically bonded structure defined by a plurality of alginate chains forming at least one ionic bond with the ionic crosslinking agent, and wherein the first and the second crosslinked structures are arranged to cooperatively dissipate energy in response to mechanical loads applied onto the electrolyte such that electrochemical performance of the supercapacitor remains substantially unchanged upon the mechanical loads are applied and removed.

9. The supercapacitor in accordance with claim 8, wherein the supercapacitor is a flexible electrical component.

10. The supercapacitor in accordance with claim 8, wherein each electrode comprises a current collector, active material, electrical conductive particles and one or more binders.

11. The supercapacitor in accordance with claim 10, wherein the current collector of each electrode comprises at least one of carbon nanotube paper, carbon cloth, carbon paper or nickel foam.

12. The supercapacitor in accordance with claim 10, wherein the active material of each electrode comprises polypyrrole (PPy), wherein the PPy is prepared by electrochemical deposition, and wherein an electrochemical deposition time is 10-900 s.

13. The supercapacitor in accordance with claim 8, wherein the supercapacitor being obtained by sandwiching the hydrogel electrolyte between the pair of electrodes, and wherein outer sides of the pair of electrodes is covered with the hydrogel electrolyte.

14. The supercapacitor in accordance with claim 8, wherein the aqueous electrolyte solution of the hydrogel electrolyte comprises at least one salt or acid, wherein the at least one salt or acid has a concentration of 0.1M to 2M.

15. The supercapacitor in accordance with claim 8, wherein the hydrogel electrolyte is formed by mixing &gel monomer for the first crosslinked structure, a polymer for the second crosslinked structure, an initiator and a crosslinking agent for the first crosslinked structure in deionized water and curing in room temperature or a higher temperature, then soaking with an aqueous solution containing the ionic crosslinking agent.

16. The supercapacitor in accordance with claim 15, wherein the gel monomer for the first crosslinked network comprises acrylamide in an amount of 5 wt % to 20 wt % based on a total amount of the hydrogel electrolyte, and wherein the polymer for the second crosslinked network comprises alginate in an amount of 0.5 wt % to 5 wt % based on the total amount of the hydrogel electrolyte.

17. The supercapacitor in accordance with claim 8, wherein the one or more ions is selected from the group consisting of $Ca^{2+}$, $Mg^{2+}$, $Zn^{2+}$, $Al^{2+}$, $Fe^{2+}$ and wherein a concentration of the one or more ions is between 0.01M to 0.5M.

18. An electrical component comprising:
a first electrode and a second electrode, the first and second electrode being spaced apart from each other, and
an electrolyte disposed between the first electrode and the second electrode, the electrolyte comprising:
a hydrogel including a first crosslinked structure and a second crosslinked structure, and an aqueous solution including a polymer matrix within the aqueous solution, wherein the aqueous solution includes an ionic crosslinking agent including one or more ions that interact with the second crosslinked structure, wherein the first crosslinked structure includes a covalently bonded structure defined by a plurality of acrylamide chains forming at least one covalent bond with each other, wherein the second crosslinked structure includes an ionically bonded structure defined by a plurality of alginate chains forming at least one ionic bond with the ionic crosslinking agent, and wherein the first and second crosslinked structures are arranged to cooperatively dissipate energy in response to mechanical loads applied onto the electrolyte such that electrochemical performance of the supercapacitor remains substantially unchanged upon the mechanical loads being applied and removed.

19. The electrical component in accordance with claim 18, wherein each of the first electrode and the second electrode are electrically conductive plates.

20. The electrical component in accordance with claim 18, wherein the electrical component is a super-capacitor.

21. The electrical component in accordance with claim 18, wherein the electrolyte is configured to elastically deform or elastically flex in response to the mechanical loads applied to the electrical component, while still maintaining capacitor function.

22. The electrical component in accordance with claim 18, wherein the ionically crosslinked structure is configured to dissipate energy when the electrical component is subjected to the mechanical loads by rupturing bonds within the ionically crosslinked structure, and further configured to restore bonds when the electrical component is unloaded.

23. The electrical component in accordance with claim 18, wherein the covalently bonded structure is configured to provide a bridging structure and to maintain physical boundaries of the electrolyte thereby preventing the electrolyte from separating or dissociating.

24. The electrical component in accordance with claim 18, the aqueous solution comprising a salt or acid within the aqueous solution.

25. The electrical component in accordance with claim 18, wherein the one or more ions are selected from the group consisting of Calcium, Zinc, Magnesium, Iron or Aluminium.

26. The electrical component in accordance with claim 24, wherein the salt or acid comprising a concentration of 0.1M to 2M.

27. The electrical component in accordance with claim 18, the amount of acrylamide comprising 5% weight to 20% weight of a total amount of the electrolyte, and the amount of alginate comprising 0.5% weight to 5% weight of the total amount of the electrolyte.

28. The electrical component in accordance with claim 18, wherein each of the first and second electrodes comprises a current collector and an active material coupled to each other.

29. The electrical component in accordance with claim 28, the current collector of each of the first and second electrodes comprising a material selected from consisting of: carbon nanotube paper, carbon cloth, carbon paper, nickel foam.

30. The electrical component in accordance with claim 28, the active material of each of the first and the second electrodes comprising polypyrrole (PPy) that is electrodeposited onto the current collector.

31. The electrical component in accordance with claim 18, wherein the electrolyte is sandwiched between the first electrode and the second electrode, wherein each electrode comprises a proximal surface and a distal surface, wherein the proximal surfaces of each electrode are proximal to each other and face each other and the distal surfaces are distal to each other, and wherein the electrolyte covers at least each proximal surface of each electrode.

32. A method of constructing an electrical component comprising the steps of:
forming a first electrode;
forming a second electrode;
forming an electrolyte;
sandwiching the electrolyte between the first electrode and second electrode, the electrolyte comprising:
a hydrogel including a first crosslinked structure and a second crosslinked structure;
an aqueous solution including a polymer matrix within the aqueous solution, wherein the aqueous solution includes an ionic crosslinking agent including one or more ions that interact with the second crosslinked structure, wherein the first crosslinked structure includes a covalently bonded structure defined by a plurality of acrylamide chains forming at least one covalent bond with each other, wherein the second crosslinked structure includes an ionically bonded structure defined by a plurality of alginate chains forming at least one ionic bond with the ionic crosslinking agent, and wherein the first and the second crosslinked structures are arranged to cooperatively dissipate energy in response to mechanical loads applied onto the electrolyte such that electrochemical performance of the supercapacitor remains substantially unchanged upon the mechanical loads are applied and removed.

33. The method of constructing an electrical component in accordance with claim 32, the step of forming the electrolyte comprising the additional steps of:
- forming a mixture of a first gel monomer, an initiator and a crosslinking agent in deionized water;
- adding an alginate into the mixture to form a blend;
- curing the blend at room temperature or a higher temperature; and
- soaking the cured blend in an aqueous electrolyte solution.

34. The method of constructing an electrical component in accordance with claim 32, wherein the first and the second electrodes are formed by the steps of:
- providing a carbon nanotube paper; and
- electrochemically depositing polypyrrole (PPy) onto the carbon nanotube paper.

35. A method of forming a hydrogel electrolyte for use in an electrical component to provide the electrical component with mechanical robustness and substantially stable electrochemical performance in response to a mechanical load applied to the electrical component, wherein the method comprises the steps of:
- forming a mixture of a first gel monomer, an initiator and a crosslinking agent in deionized water;
- adding an alginate into the mixture to form a blend;
- curing the blend at room temperature or a higher temperature; and
- soaking the cured blend in an aqueous electrolyte solution.

36. The method of forming a hydrogel electrolyte for use in an electrical component to provide the electrical component with mechanical robustness and substantially stable electrochemical performance in response to a mechanical load applied to the electrical component in accordance with claim 35, the hydrogel electrolyte comprising a first crosslinked network and a second crosslinked network, and wherein the first crosslinked network is a covalently bonded network and the second crosslinked network is an ionically bonded network.

37. The method of forming a hydrogel electrolyte for use in an electrical component to provide the electrical component with mechanical robustness and substantially stable electrochemical performance in response to a mechanical load applied to the electrical component in accordance with claim 35, wherein the first gel monomer is an acrylamide monomer, the initiator is ammonium persulphate, and the crosslinking agent is N,N'-methylenebisacrylamide.

38. The method of forming a hydrogel electrolyte for use in an electrical component to provide the electrical component with mechanical robustness and substantially stable electrochemical performance in response to a mechanical load applied to the electrical component in accordance with claim 35, wherein the aqueous electrolyte solution comprises $Al_2Cl_3$ and $Li_2SO_4$.

* * * * *